United States Patent
Hu et al.

(10) Patent No.: US 10,908,467 B2
(45) Date of Patent: Feb. 2, 2021

(54) ARRAY SUBSTRATE AND REPAIRING METHOD THEREOF, DISPLAY PANEL

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Lang Hu, Beijing (CN); Kaiqiang Li, Beijing (CN); Yang Yu, Beijing (CN); Chaolei Wang, Beijing (CN); Nannan Rong, Beijing (CN); Yaohua Jiang, Beijing (CN); Qiulin Wu, Beijing (CN); Baohao Zhang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/522,854

(22) Filed: Jul. 26, 2019

(65) Prior Publication Data
US 2020/0033682 A1    Jan. 30, 2020

(30) Foreign Application Priority Data
Jul. 27, 2018    (CN) .......................... 2018 1 0842771

(51) Int. Cl.
*G02F 1/1362*  (2006.01)
*G02F 1/1368*  (2006.01)

(52) U.S. Cl.
CPC ...... *G02F 1/136259* (2013.01); *G02F 1/1368* (2013.01); *G02F 1/136286* (2013.01);
(Continued)

(58) Field of Classification Search
None
See application file for complete search history.

(56) References Cited

U.S. PATENT DOCUMENTS

9,678,399 B2 *  6/2017  Hua ................... G02F 1/136259
9,887,214 B2 *  2/2018  Gao ................... G02F 1/136259
(Continued)

*Primary Examiner* — J.E. Schoenholtz
(74) *Attorney, Agent, or Firm* — Nath, Goldberg & Meyer; Joshua B. Goldberg (57) ABSTRACT

The present disclosure provides an array substrate and a method for repairing the same, and a display panel. The array substrate includes gate lines extending in a first direction, and data lines and common electrode lines extending in a second direction. The gate lines intersect with the common electrode lines and the data lines to define pixel units. Every two adjacent pixel units at two sides of a common electrode line constitute a pixel unit group. Common electrodes of two pixel units in a pixel unit group are each connected to a common electrode line therebetween. The array substrate further includes a repairing structure including a first repairing line, a second repairing line at two sides of a data line, respectively, and a middle line intersecting with the data line and connecting a first point of the first repairing line and a second point of the second repairing line.

15 Claims, 4 Drawing Sheets

(52) U.S. Cl.
CPC ............ *G02F 2001/136263* (2013.01); *G02F 2001/136272* (2013.01)

(56) References Cited

U.S. PATENT DOCUMENTS

2002/0047977 A1* 4/2002 Lee .................. G02F 1/136259
  349/141
2016/0187750 A1* 6/2016 Tang ................ G02F 1/136204
  349/42
2016/0358524 A1* 12/2016 Feng ................ G02F 1/136259

\* cited by examiner

ARRAY SUBSTRATE AND REPAIRING METHOD THEREOF, DISPLAY PANEL

CROSS-REFERENCE TO RELATED APPLICATION

This application claims priority to Chinese Patent Application No. 201810842771.3, filed on Jul. 27, 2018, the entire contents of which are hereby incorporated by reference.

TECHNICAL FIELD

The present disclosure belongs to the field of display technology, and particularly, relates to an array substrate and a method for repairing the same, and a display panel.

BACKGROUND

The process of manufacturing a liquid crystal display panel typically includes steps of forming an array substrate, forming a color filter substrate, and assembling the array substrate and the color filter substrate to form the liquid crystal display panel. For example, the step of forming the array substrate may include depositing a metal film and a semiconductor film on a lower base substrate, and then patterning the metal film and the semiconductor film to form required metal patterns (for example, gate lines, data lines and common electrode lines) and semiconductor patterns (e.g., an active layer). The step of forming the color filter substrate may be similar to that of forming the array substrate and includes forming pixel blocks, such as red (R) pixel blocks, green (G) pixel blocks and blue (B) pixel blocks, on an upper base substrate.

SUMMARY

In an aspect, the present disclosure provides an array substrate including a plurality of gate lines extending in a first direction, and a plurality of data lines and a plurality of common electrode lines extending in a second direction. The plurality of common electrode lines and the plurality of data lines are alternately arranged. The plurality of gate lines intersect with the plurality of common electrode lines and the plurality of data lines to define a plurality of pixel units. Every two adjacent ones of the plurality of pixel units at two sides of one of the common electrode lines constitute a pixel unit group, and common electrodes of two pixel units of the plurality of pixel units in a same pixel unit group are each connected to a common electrode line between the two pixel units. The array substrate further includes a repairing structure between two adjacent pixel unit groups in the first direction and including a first repairing line, a second repairing line and a middle line. The first repairing line and the second repairing line are at two sides of a data line of the plurality of data lines between the two pixel unit groups, respectively, and the middle line intersects with the data line between the two pixel unit groups and connects a first point of the first repairing line and a second point of the second repairing line. The first repairing line is connected to a common electrode of a pixel unit of the plurality of pixel units adjacent to the repairing structure at a side of the repairing structure, and the second repairing line is connected to a common electrode of a pixel unit of the plurality of pixel units adjacent to the repairing structure at another side of the repairing structure.

In some embodiments, the repairing structure and the plurality of gate lines are in a same layer.

In some embodiments, the first repairing line and the second repairing line are parallel to the data line.

In some embodiments, the middle line connects a middle point of the first repairing line and a middle point of the second repairing line.

In some embodiments, each pixel unit group includes a first pixel unit and a second pixel unit, the first pixel unit includes a first thin film transistor, the second pixel unit includes a second thin film transistor, and a source electrode of the first thin film transistor and a source electrode of the second thin film transistor in a same pixel unit group are connected to a same one of the plurality of data lines.

In some embodiments, in a same pixel unit group, a drain electrode of the first thin film transistor is connected to a pixel electrode of the first pixel unit; a drain electrode of the second thin film transistor is connected to a pixel electrode of the second pixel unit through a conductive line, and the second thin film transistor and the conductive line are not covered by any common electrode of the pixel unit group.

In some embodiments, the conductive line includes a connection electrode in a same layer with the common electrode and a metal connection line in a same layer with the data line.

In some embodiments, the first pixel unit and the second pixel unit in a same pixel unit group share one common electrode.

In some embodiments, the first pixel unit and the second pixel unit in a same pixel unit group are connected to two gate lines of the plurality of gate lines at two sides of the pixel unit group, respectively.

In another aspect, the present disclosure further provides a method for repairing an array substrate. The array substrate is any of the array substrates according to the present disclosure. The method includes: in a case where at least one of the gate lines and the data lines has a disconnection point, performing a cutting process on at least one of the repairing structure, a common electrode of a pixel unit and a common electrode line, which are adjacent to the disconnection point, such that a signal supposed to be transmitted through the disconnection point is transmitted through at least one of the repairing structure, the common electrode and the common electrode line and bypasses the disconnection point.

In some embodiments, in a case where the data line has a first disconnection point between middle lines of two adjacent repairing structures, the method includes: for each of the two adjacent repairing structures at two sides of the first disconnection point, performing a cutting process at the second point to disconnect the second repairing line and the middle line; for each of the two adjacent repairing structures, performing a cutting process on the first repairing line, a common electrode of the pixel unit connected to the first repairing line and the common electrode line of the pixel unit, from a third point of the first repairing line on a side of the first point away from the first disconnection point to an edge of the pixel unit close to the other repairing structure of the two adjacent repairing structures; and electrically connecting both of the middle lines of the two adjacent repairing structures at the two sides of the first disconnection point with the data line.

In some embodiments, each pixel unit group includes a first pixel unit and a second pixel unit, the first pixel unit includes a first thin film transistor, the second pixel unit includes a second thin film transistor, a source electrode of the first thin film transistor and a source electrode of the second thin film transistor in a same pixel unit group are connected to a same data line, and a gate electrode of the first thin film transistor and a gate electrode of the second thin film transistor in a same pixel group are connected to two of the plurality of gate lines at two sides of the pixel unit group, respectively. In a case where a gate line of the plurality of gate lines connected to the second pixel unit has a second disconnection point between two second pixel unit, the method includes: for each of two common electrode lines at two sides of the second disconnection point, performing a cutting process on the common electrode line at two sides of the gate line having the second disconnection point to obtain a common electrode line segment; electrically connecting one end of the common electrode line segment to the gate line through a welding spot at an intersection therebetween; and performing a cutting process on a common electrode of a pixel unit to which the common electrode line segment is connected from the other end of the common electrode line segment to a fourth point of the first repairing line to which the pixel unit is connected on a side of the first point away from the second disconnection point.

In some embodiments, each pixel unit group includes a first pixel unit and a second pixel unit, the first pixel unit includes a first thin film transistor, the second pixel unit includes a second thin film transistor, a source electrode of the first thin film transistor and a source electrode of the second thin film transistor in a same pixel unit group are connected to a same data line, a drain electrode of the first thin film transistor is electrically connected to a pixel electrode of the first pixel unit, a drain electrode of the second thin film transistor is electrically connected to a pixel electrode of the second pixel unit through a conductive line, and the second thin film transistor and the conductive line are not covered by any common electrode of the pixel unit group. In a case where the second pixel unit is a bright spot, the method includes performing a cutting process on the conductive line of the second pixel unit as the bright spot at two sides of a common electrode line adjacent to the second pixel unit.

In some embodiments, in a case where a gate line of the plurality of gate lines connected to the second pixel unit has a third disconnection point between two first pixel units, the method includes: performing a cutting process to disconnect the source electrode of the second thin film transistor of the second pixel unit from the data line; performing a cutting process to disconnect the conductive line from the pixel electrode of the second pixel unit; performing a cutting process on a common electrode line adjacent to the third disconnection point at a position of the common electrode line on a side of the gate line away from the conductive line and at a position of the common electrode line on a side of the conductive line away from the gate line, thereby forming a connection segment; electrically connecting the drain electrode of the second thin film transistor and the gate line through a welding spot at an intersection therebetween; electrically connecting the conductive line and the common electrode line through a welding spot at an intersection therebetween; and electrically connecting the gate line and the common electrode line through a welding spot at an intersection therebetween.

The present disclosure further provides a display panel including the array substrate described herein.

DETAILED DESCRIPTION

To make those skilled in the art better understand the technical solutions of the present disclosure, the present disclosure will be further described in detail below in conjunction with accompanying drawings and specific embodiments.

The assembled liquid crystal display panels are required to be tested for the display performance thereof. The test on the assembled liquid crystal display panels are typically performed by a CT light-on apparatus and the defective liquid crystal display panels are collected and repaired based on their defect types, thereby improving product yield. Since no additional repairing line can be added to the array substrate after the liquid crystal display panel is assembled, a broken line of the array substrate can only be repaired by using the wiring structure of the array substrate itself, increasing repair difficulty.

In view of the above problems, the present disclosure provides an array substrate having increased repairability and a method for repairing the same.

Figure 1:
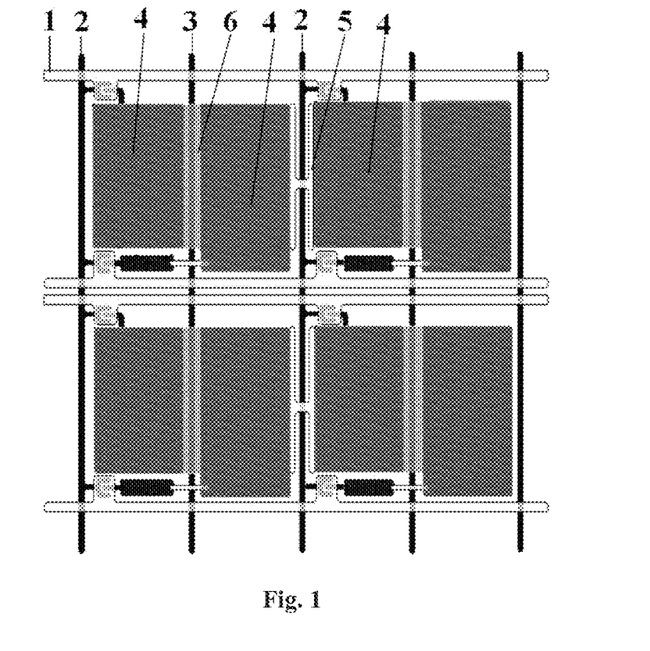
FIG. 1 is a schematic diagram of a structure of an array substrate according to an embodiment of the present disclosure.

FIG. 1 is a schematic diagram of a structure of an array substrate according to an embodiment of the present disclosure. As illustrated in FIG. 1, the array substrate includes: a base substrate (not shown); and a plurality of gate lines 1 extending in a first direction on the base substrate, and a plurality of data lines 2 and a plurality of common electrode lines 3 extending in a second direction on the base substrate. The common electrode lines 3 and the data lines 2 are alternately arranged. The plurality of gate lines 1 intersect with the plurality of common electrode lines 3 and the plurality of data lines 2 to define a plurality of pixel units 4. Every two adjacent pixel units 4 at two sides of a common electrode line 3 constitute a pixel unit group, and common electrodes 6 of two pixel units 4 in a same pixel unit group are each connected to a common electrode line 3 between the two pixel units 4. The array substrate further includes a repairing structure 5 between two adjacent pixel unit groups in the first direction, and the repairing structure 5 is connected to common electrodes 6 of the pixel units at two sides of the repairing structure 5. The repairing structure 5 facilitates repairing the gate line 1 and/or the data line 2 having a disconnection point, such that the signal in the gate line 1 and/or the data line 2 can be transmitted through the repairing structure 5, the common electrode 6 and/or the common electrode line 3 to bypass the disconnection point. In some embodiments, the first direction and the second direction are perpendicular to each other.

The array substrate according to the present embodiment is provided with the repairing structure 5 connected to the common electrodes 6 of the adjacent pixel units from the adjacent pixel unit groups thereon, and in a case where the gate line 1 and/or the data line 2 has a disconnection point, the repairing substrate 5 can be utilized to repair the gate line 1 and/or the data line 2, such that the signal in the gate line 1 and/or the data line 2 can be transmitted through the repairing structure 5, the common electrode 6 and/or the common electrode line 3 to bypass the disconnection point.

Figure 2:
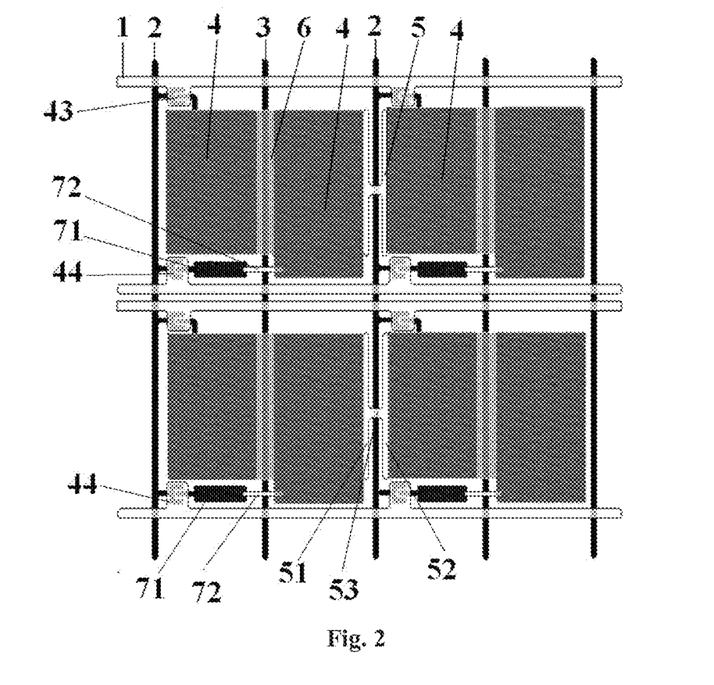
FIG. 2 is a schematic diagram of a structure of an array substrate according to an embodiment of the present disclosure.

FIG. 2 is a schematic diagram of a structure of an array substrate according to an embodiment of the present disclosure. As illustrated in FIG. 2, the array substrate includes: a base substrate (not shown); and a plurality of gate lines 1 extending in a first direction on the base substrate, and a plurality of data lines 2 and a plurality of common electrode lines 3 extending in a second direction on the base substrate. The common electrode lines 3 and the data lines 2 are alternately arranged. The plurality of gate lines 1 intersect with, and are insulated from, the plurality of common electrode lines 3 and the plurality of data lines 2 to define a plurality of pixel units 4. Every two adjacent pixel units 4 at two sides of a common electrode line 3 constitute a pixel unit group, and common electrodes 6 of two pixel units 4 in a same pixel unit group are each connected to a common electrode line 3 between the two pixel units 4. The array substrate further includes a repairing structure 5 between adjacent pixel unit groups in the first direction and in a same layer with the gate lines 1. The repairing structure 5 is connected to common electrodes 6 of the pixel units at two sides thereof. The repairing structure 5 facilitates repairing the gate line 1 and/or the data line 2 having a disconnection point, such that the signal in the gate line 1 and/or the data line 2 can be transmitted through the repairing structure 5, the common electrode 6 and/or the common electrode line 3 to bypass the disconnection point. In an example, the array substrate according to the embodiments of the present disclosure is in a normal black mode.

In some embodiments, the common electrode lines 3 and the gate lines 1 are in different layers, the common electrode lines 3 and the data lines 2 are in a same layer and are parallel to each other, the repairing structure 5 and the gate lines 1 are in a same layer, and the common electrode 6 is connected to the common electrode line 3 through a via hole. According to the embodiments of the present disclosure, the array substrate may have a dual-gate design suitable for ADS display mode, and have the pixel electrode and the common electrode 6 both on the array substrate.

In some embodiments, the repairing structure 5 includes a first repairing line 51 and a second repairing line 52 at two sides of the data line 2, and a middle line 53 intersecting with the data line 2 and connecting a first point A of the first repairing line and a second point B of the second repairing line. The first repairing line 51 is connected to a common electrode of a pixel unit adjacent to the repairing structure 5 at a side of the repairing structure 5, and the second repairing line 52 is connected to a common electrode of a pixel unit adjacent to the repairing structure 5 at another side of the repairing structure 5.

In some embodiments, the first repairing line 51 and the second repairing line 52 are parallel to the data line 2, the first repairing line 51 and the second repairing line 52 are connected through the middle line 53, and the middle line 53 intersects with and is insulated from the data line 2. In some embodiments, the middle line 53 connects a middle point of the first repairing line 51 and a middle point of the second repairing line 52.

Figure 3:
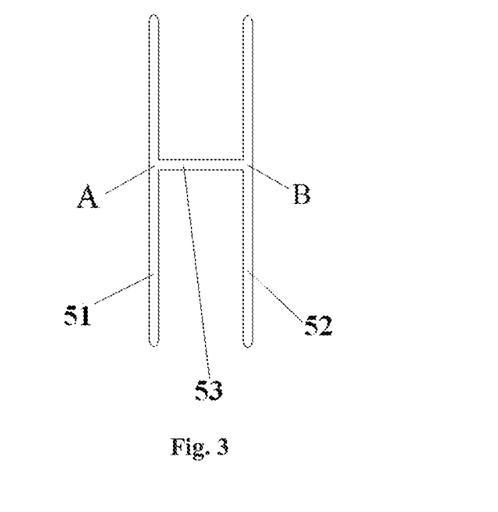
FIG. 3 is a schematic diagram of a repairing structure of an array substrate according to an embodiment of the present disclosure.

As illustrated in FIG. 3, the repairing structure 5 is of an "H" shape, the first repairing line 51 is connected to the common electrode 6 of the pixel unit at the left side thereof, and the second repairing line 52 is connected to the common electrode 6 of the pixel unit at the right side thereof.

In some embodiments, each pixel unit group includes a first pixel unit 41 and a second pixel unit 42 (referring to FIG. 4), the first pixel unit 41 includes a first thin film transistor 43 (referring to FIG. 2), the second pixel unit 42 includes a second thin film transistor 44 (referring to FIG. 2), and a source electrode of the first thin film transistor 43 and a source electrode of the second thin film transistor 44 of a same pixel unit group are connected to a same data line 2. In a same pixel unit group, a drain electrode of the first thin film transistor 43 is connected to a pixel electrode of the first pixel unit 41; a drain electrode of the second thin film transistor 44 is connected to a pixel electrode of the second pixel unit 42 through a conductive line 70, and the second thin film transistor 44 and the conductive line are not covered by the common electrode 6, as illustrated in FIG. 2. In an embodiment, gate electrodes of the first thin film transistor 43 and the second thin film transistor 44 in a same pixel unit group are connected to two gate lines at two sides of the pixel unit group, respectively.

In some embodiments, two pixel units in a same pixel unit group may share a same common electrode 6. Source electrodes of thin film transistors of two pixel units in a same pixel unit group are connected to a same data line 2, thereby facilitating high efficient bright-spot repair. For example, in a case where the second pixel unit 42 is a bright spot, the conductive line may be cut to disconnect the second pixel unit 42 from the second thin film transistor 44, so that the disconnected second pixel unit 42 becomes a dark spot because the array substrate according to the present embodiment is in the normal black mode. The conductive line is thin and far away from the data line 2 and the pixel display area, so that less spatters are produced in the cutting process, thereby reducing influence on the pixel unit and improving possibility of successful repair. Moreover, the second thin film transistor 44 and the conductive line are not covered by the common electrode 6, so that it is convenient to cut or weld the conductive line in a subsequent repairing process to facilitate the repairing process.

In an embodiment, the conductive line includes a connection electrode 71 in a same layer with the common electrode 6 and/or a metal connection line 72 in a same layer with the data line 2.

That is to say, the conductive line 70 and the common electrode 6 may be in a same layer, or the conductive line 70 and the data line 2 may be in a same layer. The common electrode 6 may be formed of ITO, and the data line 2 may be formed of a metal. As illustrated in FIG. 2, the drain electrode of the second thin film transistor 44 is connected to the pixel electrode of the second pixel unit 42 sequentially through the connection electrode 71 and the metal connection line 72, such that the connection electrode 71 has a relatively larger area and can correspond to the spacer for supporting the liquid crystal cell.

The size, thickness and the like of each of the structural layers shown in the drawings of the embodiments of the present disclosure are merely for the purpose of illustration. In actual processes, the projections of the structural layers on the base substrate may have a same area or may have different areas, and the required areas of the projections of the structural layers may be realized by an etching process. Moreover, the geometry shapes of the structural layers are not limited to those shown in the drawings. For example, the geometry shapes may be rectangular shapes as shown in the drawings, and may be trapezoid shapes, or other shapes which are formed by an etching process.

In another aspect, embodiments of the present disclosure provide a method for repairing the above array substrate. In a case where the gate line 1 and/or the data line 2 has (have) a disconnection point, the method includes performing a cutting process on at least one of the repairing structure 5, a common electrode of a pixel unit and a common electrode line adjacent to the disconnection point, such that a signal supposed to be transmitted through the disconnection point can be transmitted through at least one of the repairing structure 5, the common electrode 6 and the common electrode line 3 and bypass the disconnection point.

In the method according to the embodiments of the present disclosure, the repairing structure 5 disposed on the array substrate and connected to the common electrodes 6 of the adjacent pixel units from adjacent pixel unit groups is utilized to repair the disconnection point. In a case where the gate line 1 and/or the data line 2 has (have) a disconnection point, a cutting process may be performed on the repairing structure 5 and the common electrode 6 of the pixel unit connected to the repairing structure 5, such that a signal supposed to be transmitted through the disconnection point can be transmitted through at least one of the repairing structure 5, the common electrode 6 and the common electrode line 3 and bypass the disconnection point.

Figure 4:
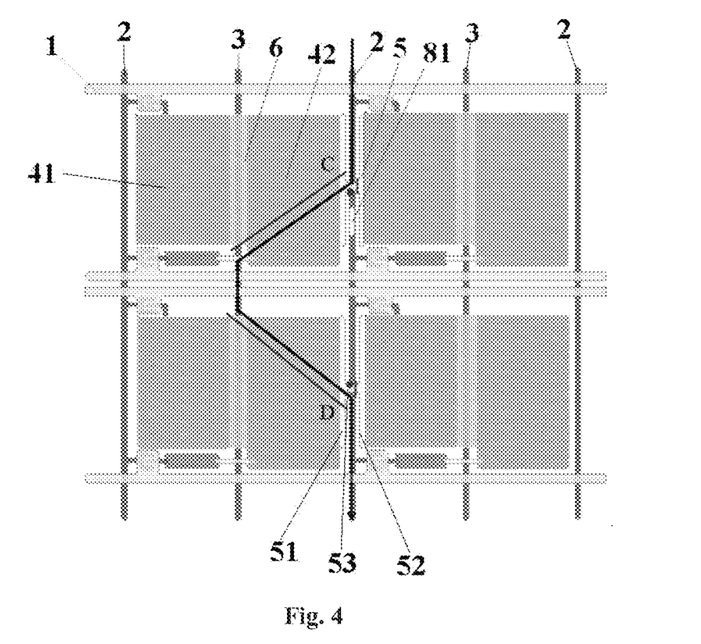
FIG. 4 is a schematic diagram of a first example of a method for repairing an array substrate according to an embodiment of the present disclosure.

In an embodiment and as illustrated in FIG. 4, the data line 2 has a first disconnection point 81 between the middle lines 53 of two adjacent repairing structures 5. In this case, the method includes steps S01 to S03.

In step S01, for each of the two adjacent repairing structures 5 at two sides of the first disconnection point 81, a cutting process is performed at the second point to disconnect the second repairing line 52 and the middle line 53. As illustrated in FIG. 4, the second repairing line 52 above the first disconnection point 81 and at a right side of the data line 2 is cut, so that the middle line 53 and the second repairing line 52 at the right side thereof are disconnected. A similar operation is performed on the second repairing line 52 that is below the first disconnection point 81 and at the right side of the data line 2.

In step S02, for each of the two repairing structures 5, a cutting process is performed on the first repairing line 51 and the common electrode 6 and the common electrode line 3 of the pixel unit connected to the first repairing line 51, from a third point C of the first repairing line 51 on a side of the first point A away from the first disconnection point 81 to an edge of the pixel unit close to another repairing structure 5. As illustrated in FIG. 4, the cutting process is performed on the common electrode 6 and the common electrode line 3 of the pixel unit at the left side of the disconnection point 81, from a point of the "H" shaped structure above the middle line 53 to the bottom of the pixel unit. A similar operation is performed on a pixel unit below the pixel unit.

In step S03, the middle lines 53 of the two adjacent repairing structures 5 at the two sides of the first disconnection point 81 are electrically connected to the data line 2, as indicated by the solid circles in FIG. 4.

As such, the first repairing lines 51 of 3 repairing structures 5 can be electrically connected through the common electrodes 6 and the common electrode line 3 that have been cut.

After the first disconnection point 81 of the data line 2 is repaired, two dark spots will be presented at the two pixel units that have been cut, and the repaired data signal transmission path is represented by the black thick line in FIG. 4.

Figure 5:
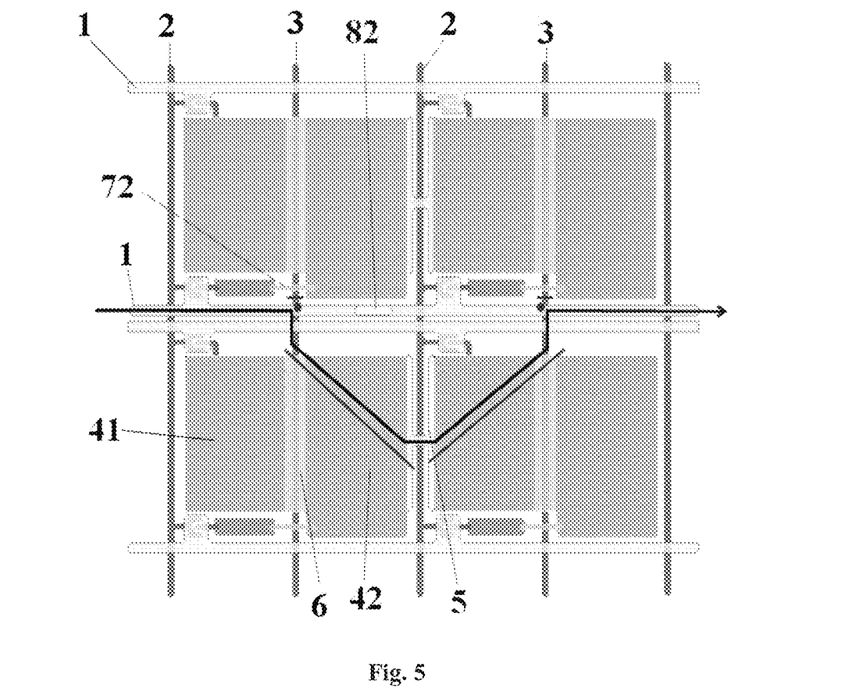
FIG. 5 is a schematic diagram of a second example of a method for repairing an array substrate according to an embodiment of the present disclosure.

In another embodiment and as illustrated in FIG. 5, the gate line 1 connected to the second pixel unit 42 has a second disconnection point 82 between two second pixel units 42. In this case, the method includes the following steps S11 to S13.

In step S11, for each of two common electrode lines 3 at two sides of the second disconnection point 82, a cutting process is performed on the common electrode line 3 at two sides of the gate line 1 having the second disconnection point 82 to obtain a common electrode line segment. As illustrated in FIG. 5, the common electrode line 3 at the left side of the second disconnection point 82 is cut at a position thereof between the gate line 1 and the metal connection line 72, and a similar operation is performed on the common electrode line 3 at the right side of the second disconnection point 82 at a position thereof between the gate line 1 and the metal connection line 72.

In step S12, one end of the common electrode line segment is electrically connected to the gate line 1 through a welding spot at the intersection therebetween, as indicated by the solid circles in FIG. 5.

In step S13, a cutting process is performed on the common electrode 6 of the pixel unit within Which the other end of the common electrode line segment is located, from the other end of the common electrode line segment to a fourth point D of the first repairing line 51 to which the pixel unit is connected on a side of the first point away from the second disconnection point 82. As illustrated in FIG. 5, the cutting process is performed on the common electrode line 3 and the common electrode 6 of the pixel unit below the second disconnection point 82, from a top of the common electrode 6 of the pixel unit to a point of the "H" shaped structure of the repairing structure 5 below the middle line 53. A similar operation is performed on a pixel unit at the right side of the pixel unit below the second disconnection point 82 to cut the common electrode 6 and the common electrode line 3 thereof.

As such, the welding spots are electrically connected through two common electrode line segments, the cut common electrodes 6 and the repairing structure 5.

After the second disconnection point 82 of the gate line 1 is repaired, two dark spots will be presented at the two cut pixel units that have been cut, and the repaired scan signal transmission path is represented by the black thick line in FIG. 5.

Figure 6:
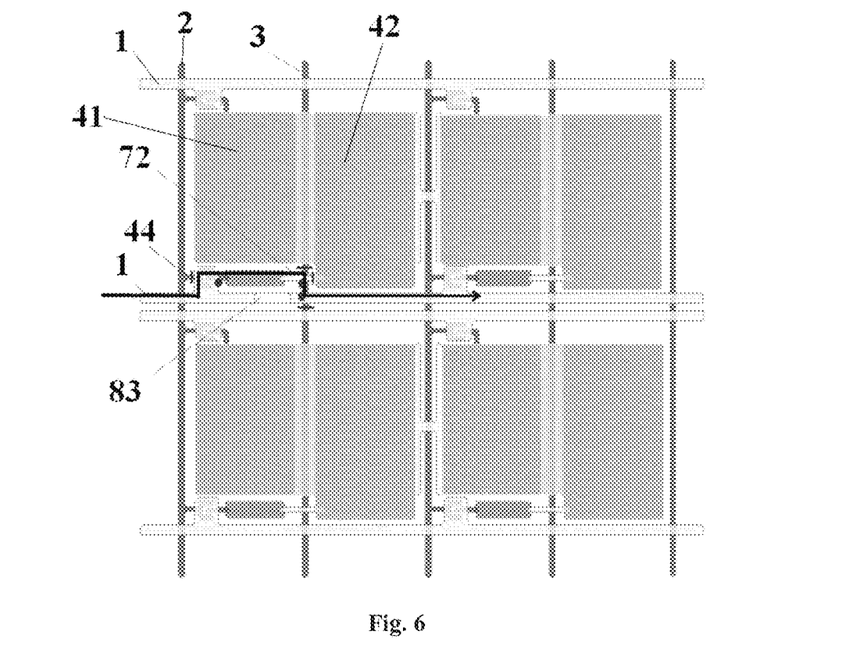
FIG. 6 is a schematic diagram of a third example of a method for repairing an array substrate according to an embodiment of the present disclosure.

In still another embodiment and as illustrated in FIG. 6, the gate line 1 connected to the second pixel unit 42 has a third disconnection point 83 between two first pixel units 41. In this case, the method includes the following steps S21 to S26.

In step S21, a cutting process is performed to disconnect the source electrode of the second thin film transistor 44 of the second pixel unit 42 and the data line 2.

In step S22, a cutting process is performed to disconnect the conductive line and the pixel electrode of the second pixel unit 42.

In step S23, a cutting process is performed on the common electrode line 3 adjacent to the third disconnection point 83 at a position of the common electrode line 3 on a side of the gate line 1 away from the conductive line and at a position of the common electrode line 3 on a side of the conductive line away from the gate line 1, thereby forming a connection segment.

In step S24, the drain electrode of the second thin film transistor 44 and the gate line 1 are electrically connected through a welding spot at the intersection therebetween.

In step S25, the conductive line and the common electrode line 3 are electrically connected through a welding spot at the intersection therebetween.

In step S26, the gate line 1 and the common electrode line 3 are electrically connected through a welding spot at the intersection therebetween.

As a result, the segments of the gate line 1 at two sides of the third disconnection point 83 are electrically connected through the drain electrode of the second thin film transistor 44, the conductive line and the connection segment of the common electrode line 3.

In the present embodiment, the voltage on the gate line 1 is transmitted to the portion of the gate line 1 at the right side of the third disconnection point 83 sequentially through the drain electrode of the second thin film transistor 44, the metal connection line 72 and the isolated part of the common electrode line 3 that is produced by the cutting process. After the third disconnection point 83 is repaired, one dark spot will be presented at the second pixel unit 42, and the repaired scan signal transmission path is represented by the black thick line in FIG. 6.

Figure 7:
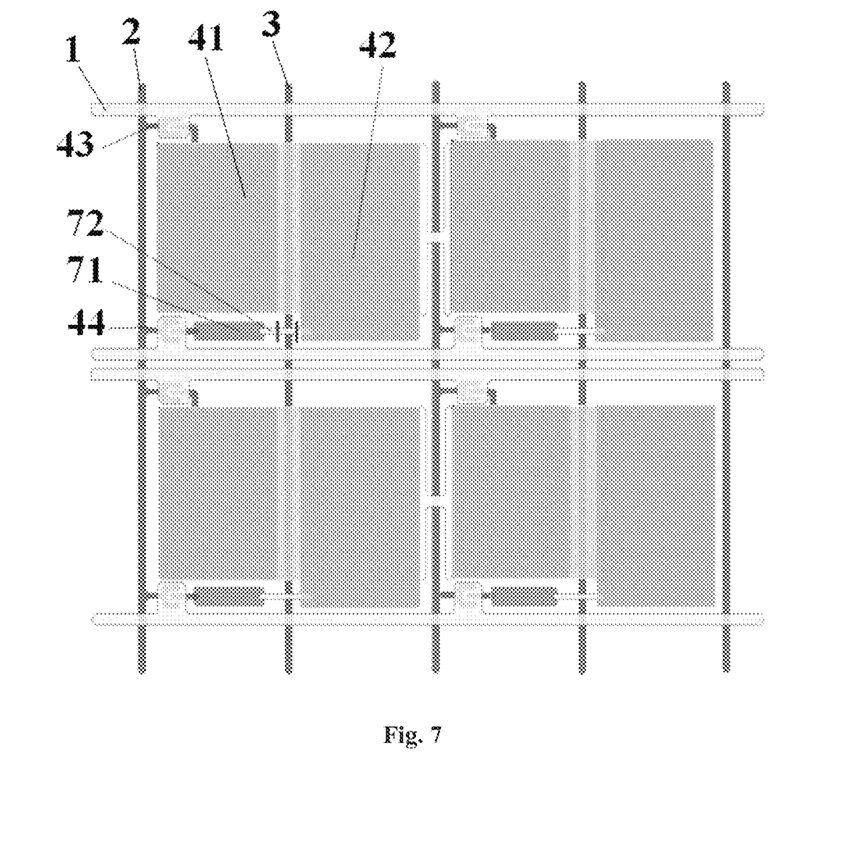
FIG. 7 is a schematic diagram of a fourth example of a method for repairing an array substrate according to an embodiment of the present disclosure.

In yet another embodiment and as illustrated in FIG. 7, the second pixel unit 42 is detected as a bright spot. In this case, the method includes: performing a cutting process on the conductive line of the second pixel unit 42 that is detected as the bright spot at two sides of the common electrode line 3 adjacent to the second pixel unit 42.

Since the array substrate of the present embodiment is in a normal black mode, the second pixel unit becomes a dark spot after the disconnection. The conductive line is thin and far away from the data line 2 and the pixel display area, so that less spatters are produced in the cutting process, thereby reducing influence on the pixel unit and improving possibility of successful repair. Moreover, the second thin film transistor 44 and the conductive line are not covered by the common electrode 6, so that it is convenient to cut or weld the conductive line in a subsequent repairing process to facilitate the repairing process.

In another aspect, embodiments of the present disclosure provide a display panel including any of the above array substrate.

In a case where the display panel according to the embodiments of the present disclosure has display defects, such as broken gate line or broken data line, or a bright spot, the display panel can be repaired by using the repairing structure of the array substrate. The method for repairing the array substrate is easy to operate. The yield of the display panel can be significantly improved through the above repairing process.

In another aspect, embodiments of the present disclosure provide a display apparatus including the above display panel. The display apparatus may be any product or part having a display function, such as a liquid crystal display panel, an electronic paper, a mobile phone, a tablet computer, a television, a monitor, a laptop computer, a digital photo frame, a navigator or the like.

It is to be understood that the above embodiments are merely exemplary embodiments for the purpose of explaining the principles of the present disclosure, but the present disclosure is not limited thereto. Various modifications and improvements can be made by those skilled in the art without departing from the spirit and scope of the present disclosure. These modifications and improvements are also considered to be within the protection scope of the present disclosure.

What is claimed is:

1. An array substrate, comprising a plurality of gate lines extending in a first direction, and a plurality of data lines and a plurality of common electrode lines extending in a second direction,
   wherein the plurality of common electrode lines and the plurality of data lines are alternately arranged, the plurality of gate lines intersect with the plurality of common electrode lines and the plurality of data lines to define a plurality of pixel units, every two adjacent ones of the plurality of pixel units at two sides of one of the common electrode lines constitute a pixel unit group, and common electrodes of two pixel units of the plurality of pixel units in a same pixel unit group are each connected to a common electrode line between the two pixel units,
   the array substrate further comprises a repairing structure between two adjacent pixel unit groups in the first direction and comprising a first repairing line, a second repairing line and a middle line, wherein the first repairing line and the second repairing line are at two sides of a data line of the plurality of data lines between the two pixel unit groups, respectively, the middle line intersects with the data line between the two pixel unit groups and connects a first point of the first repairing line and a second point of the second repairing line, the first repairing line is connected to a common electrode of a pixel unit of the plurality of pixel units adjacent to the repairing structure at a side of the repairing structure, and the second repairing line is connected to a common electrode of a pixel unit of the plurality of pixel units adjacent to the repairing structure at another side of the repairing structure.

2. The array substrate of claim 1, wherein the repairing structure and the plurality of gate lines are in a same layer.

3. The array substrate of claim 1, wherein the first repairing line and the second repairing line are parallel to the data line.

4. The array substrate of claim 3, wherein the middle line connects a middle point of the first repairing line and a middle point of the second repairing line.

5. The array substrate of claim 1, wherein each pixel unit group comprises a first pixel unit and a second pixel unit, the first pixel unit comprises a first thin film transistor, the second pixel unit comprises a second thin film transistor, and a source electrode of the first thin film transistor and a source electrode of the second thin film transistor in a same pixel unit group are connected to a same data line.

6. The array substrate of claim 5, wherein in a same pixel unit group, a drain electrode of the first thin film transistor is connected to a pixel electrode of the first pixel unit; a drain electrode of the second thin film transistor is connected to a pixel electrode of the second pixel unit through a conductive line, and the second thin film transistor and the conductive line are not covered by any common electrode of the pixel unit group.

7. The array substrate of claim 6, wherein the conductive line comprises a connection electrode in a same layer with the common electrode and a metal connection line in a same layer with the data line.

8. The array substrate of claim 5, wherein the first pixel unit and the second pixel unit in a same pixel unit group share one common electrode.

9. The array substrate of claim 5, wherein the first pixel unit and the second pixel unit in a same pixel unit group are connected to two gate lines of the plurality of gate lines at two sides of the pixel unit group, respectively.

10. A method for repairing an array substrate, wherein the array substrate comprises a plurality of gate lines extending in a first direction, and a plurality of data lines and a plurality of common electrode lines extending in a second direction, the plurality of common electrode lines and the plurality of data lines are alternately arranged, the plurality of gate lines intersect with the plurality of common electrode lines and the plurality of data lines to define a plurality of pixel units, every two adjacent ones of the plurality of pixel units at two sides of one of the common electrode lines constitute a pixel unit group, and common electrodes of two pixel units of the plurality of pixel units in a same pixel unit group are each connected to a common electrode line between the two pixel units, the array substrate further comprises a repairing structure between two adjacent pixel unit groups in the first direction and comprising a first repairing line, a second repairing line and a middle line, wherein the first repairing line and the second repairing line are at two sides of a data line of the plurality of data lines between the two pixel unit groups, respectively, the middle line intersects with the data line between the two pixel unit groups and connects a first point of the first repairing line and a second point of the second repairing line, the first repairing line is connected to a common electrode of a pixel unit of the plurality of pixel units adjacent to the repairing structure at a side of the repairing structure, and the second repairing line is connected to a common electrode of a pixel unit of the plurality of pixel units adjacent to the repairing structure at another side of the repairing structure, and the method comprises:
in a case where at least one of the gate lines and the data lines has a disconnection point, performing a cutting process on at least one of the repairing structure, a common electrode of a pixel unit and a common electrode line, which are adjacent to the disconnection point, such that a signal supposed to be transmitted through the disconnection point is transmitted through at least one of the repairing structure, the common electrode and the common electrode line and bypasses the disconnection point.

11. The method of claim 10, wherein in a case where the data line has a first disconnection point between middle lines of two adjacent repairing structures, the method comprises:
for each of the two adjacent repairing structures at two sides of the first disconnection point, performing a cutting process at the second point to disconnect the second repairing line and the middle line;
for each of the two adjacent repairing structures, performing a cutting process on the first repairing line, a common electrode of the pixel unit connected to the first repairing line and a common electrode line of the pixel unit, from a third point of the first repairing line on a side of the first point away from the first disconnection point to an edge of the pixel unit close to the other repairing structure of the two adjacent repairing structures; and
electrically connecting both of the middle lines of the two adjacent repairing structures at the two sides of the first disconnection point with the data line.

12. The method of claim 10, wherein each pixel unit group comprises a first pixel unit and a second pixel unit, the first pixel unit comprises a first thin film transistor, the second pixel unit comprises a second thin film transistor, a source electrode of the first thin film transistor and a source electrode of the second thin film transistor in a same pixel unit group are connected to a same data line, and a gate electrode of the first thin film transistor and a gate electrode of the second thin film transistor in a same pixel group are connected to two of the plurality of gate lines at two sides of the pixel unit group, respectively,
in a case where a gate line connected to the second pixel unit has a second disconnection point between two second pixel units, the method comprises:
for each of two common electrode lines at two sides of the second disconnection point, performing a cutting process on the common electrode line at two sides of the gate line having the second disconnection point to obtain a common electrode line segment;
electrically connecting one end of the common electrode line segment to the gate line through a welding spot at an intersection therebetween; and
performing a cutting process on a common electrode of a pixel unit to which the common electrode line segment is connected, from the other end of the common electrode line segment to a fourth point of the first repairing line to which the pixel unit is connected on a side of the first point away from the second disconnection point.

13. The method of claim 10, wherein each pixel unit group comprises a first pixel unit and a second pixel unit, the first pixel unit comprises a first thin film transistor, the second pixel unit comprises a second thin film transistor, a source electrode of the first thin film transistor and a source electrode of the second thin film transistor in a same pixel unit group are connected to a same data line, a drain electrode of the first thin film transistor is electrically connected to a pixel electrode of the first pixel unit, a drain electrode of the second thin film transistor is electrically connected to a pixel electrode of the second pixel unit through a conductive line, and the second thin film transistor and the conductive line are not covered by any common electrode of the pixel unit group, and
in a case where the second pixel unit is a bright spot, the method comprises:
performing a cutting process on the conductive line of the second pixel unit as the bright spot at two sides of a common electrode line adjacent to the second pixel unit.

14. The method of claim 13, wherein in a case where a gate line of the plurality of gate lines connected to the second pixel unit has a third disconnection point between two first pixel units, the method comprises:
performing a cutting process to disconnect the source electrode of the second thin film transistor of the second pixel unit from the data line;
performing a cutting process to disconnect the conductive line from the pixel electrode of the second pixel unit;
performing a cutting process on a common electrode line adjacent to the third disconnection point at a position of the common electrode line on a side of the gate line away from the conductive line and at a position of the common electrode line on a side of the conductive line away from the gate line, thereby forming a connection segment;
electrically connecting the drain electrode of the second thin film transistor and the gate line through a welding spot at an intersection therebetween;
electrically connecting the conductive line and the common electrode line through a welding spot at an intersection therebetween; and electrically connecting the gate line and the common electrode line through a welding spot at an intersection therebetween.

15. A display panel, comprising the array substrate according to claim 1.

* * * * *